July 8, 1924.　　　　　　　　　　　　　　　　　1,500,404
F. J. LOZO
GREASE CUP
Filed June 1, 1920
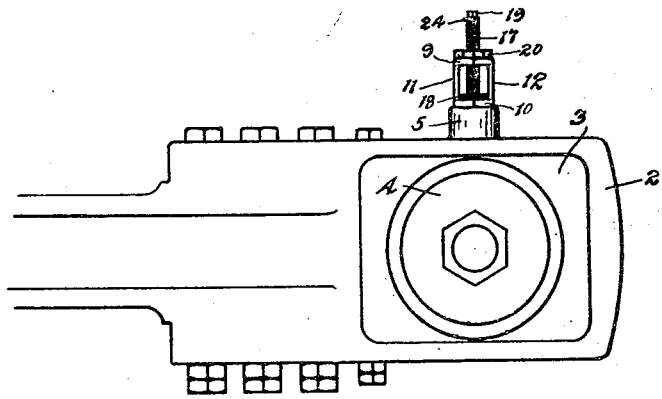
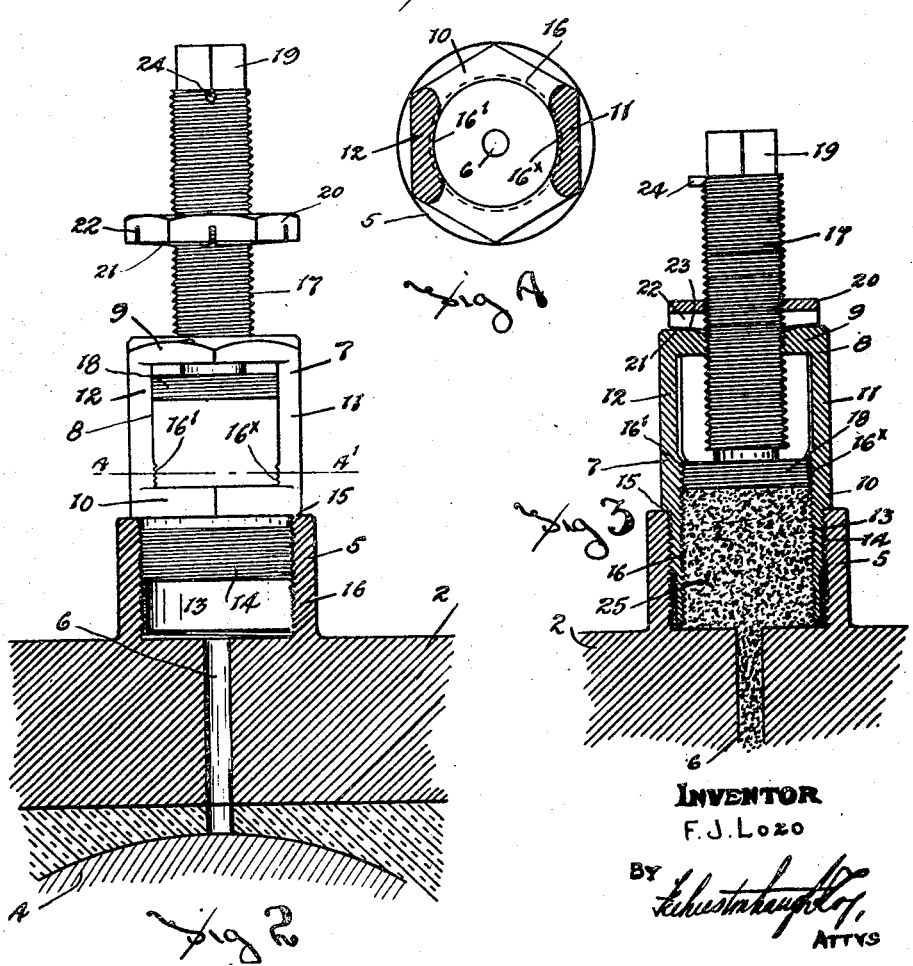
INVENTOR
F. J. Lozo
BY
ATTYS Patented July 8, 1924.

UNITED STATES PATENT OFFICE.

FRANK JAMES LOZO, OF SASKATOON, SASKATCHEWAN, CANADA.

GREASE CUP.

Application filed June 1, 1920. Serial No. 385,719.

*To all whom it may concern:*

Be it known that I, FRANK JAMES LOZO, of the city of Saskatoon, in the Province of Saskatchewan, Canada, have invented certain new and useful Improvements in Grease Cups, of which the following is the specification.

The invention relates to improvements in grease cups for feeding lubricants to shaft and such like bearings and the objects of the invention are to provide a simply constructed, easily operated, inexpensive, durable and positive feeding grease cup, to construct the grease cup so that the parts thereof will not become disjointed and lost, to arrange the plunger and stem of the cup so that ample bearing area is given to withstand the back pressure of the lubricant, to arrange the parts so that there is no possibility of the threads cutting and being harmed or destroyed, to construct the cup such that there will be a small possibility of foreign material, such as dust and dirt, getting mixed with the lubricant and to arrange the plunger stem so that it can be positively locked and will not accordingly work loose.

With the above more important objects in view the invention consists essentially in the arrangement and construction of parts hereinafter more particularly described and later pointed out in the appended claims, reference being had to the accompanying drawing in which :—

Fig. 1 is a side view of my cup as it appears in use on the connecting rod of a locomotive.

Fig. 2 is an enlarged detailed side view of the cup with the plunger up.

Fig. 3 is a vertical sectional view through the grease cup with the plunger partially up.

Fig. 4 is a horizontal sectional view at 4—4' Figure 2.

In the drawing like characters of reference indicate corresponding parts in the several figures.

Whilst I have shown this cup in the present disclosure as applied on a connecting rod to lubricate the bearing thereof, it will be readily understood I do not wish to be limited to this particular arrangement as it can be utilized to lubricate any bearing as occasion may demand.

1 represents a connecting rod presenting the customary end strap 2 receiving the bushings 3 which carry the crank pin 4 which is to be lubricated. The connecting rod strap is customarily provided on the top side with an upstanding interiorly screw threaded socket 5 and an oil duct 6 passes from the base of the socket to the bearing to be lubricated. The grease cup indicated generally by the reference numeral 7 is attached to the rod by screwing the lower end thereof tightly into the socket. The details of the grease cup are now described.

8 is the body of the cup which in the present instance is hexagonal and presents a pair of opposing heads 9 and 10 connected by side legs 11 and 12. The lower head is formed integral with a downwardly extending internally screw threaded sleeve 13, the sleeve forming a grease cup and being provided on the outer side with attaching threads 14 adapted to screw into the threads of the socket, the cup being finally in place when the shoulder 15 engages the upper end of the socket.

Here I wish it to be particularly noticed that the interior threads 16 of the sleeve extend upwardly on the inner sides of the legs as shown at 16' and 16× and the arrangement is such that the plunger, as later disclosed, when screwed down will be guided by the threads 16' and 16× before the lower face of the plunger enters the head 10 and such that when the plunger is screwed up the threads of the hand will be entirely free of the legs after they have passed away from the threads 16' and 16×.

17 is a screw threaded stem screw threaded centrally through the head 9 and having the lower end fitted with a screw threaded plunger 18 adapted to screw thread into the sleeve. The threads of the stem and plunger are such that in the turning of the stem the plunger will move up and down in the sleeve. The upper end of the stem is squared as indicated at 19 so that a wrench or similar tool can be applied to screw down the stem when desired.

20 is a lock nut screw threaded on the stem and having the underside thereof presenting a coned face 21 which is adapted to engage with the upper face of the head 9 when the nut is screwed down. The underside of the nut is radially slotted at 22 to allow the nut to spring and the upper face of the head 9 is countersunk in a tapering manner adjacent the stem to provide an engaging shoulder 23 adapted to engage the nut approximately midway between the outer edge thereof and the shank.

24 is a stud or stop pin extending outwardly from the upper end of the stem and preventing the removal of the nut. The parts of the grease cup are arranged such that it can be put together by screwing the stem and plunger into the body part from the bottom, this occurring before the nut and pin have been placed on the stem. Afterwards the nut is applied in position above the head 9 and the pin is permanently driven into the stem.

When this cup is to be used the nut is released by screwing upwardly on the stem and the stem is then turned upwardly to a position such as shown in Fig. 2. The grease 25 is then put in the cup by passing it in between the legs until the cup is full to the lever of the top face of the head 10. One then screws down the stem by applying a wrench or similar tool to the square end 19 and in so doing causes the plunger to press the lubricant or grease downwardly through the duct 6 to the bearing. The lubricant is brought under pressure by adjusting the stem and is locked in the adjusted position by tightening down the nut and here I wish it to be noticed that as the nut is tightened down the shoulder 23 exerts an up pressure which acts to spring the nut, this by virtue of the slots so that the threads bite tightly the threads of the stem.

Consequently when the adjustment is made and the nut locked there is no possibility of the parts working loose. The stem is adjusted from time to time to force down the plunger, this being done as the lubricant is used up.

In connection with this grease cup, I wish it to be noticed that when the stem is screwed down the plunger screws into the threads 16' and 16ˣ on the inner sides of the legs before the grease in the cup is brought under pressure by the plunger. Obviously as long as the under face of the plunger is above the plane containing the upper side of the head 10 there can be no great pressure developed in the grease in the cup. As soon, however, as the plunger enters the head the only escape for the grease is through the duct 6 with the result that very shortly after the plunger enters the head the grease is brought under considerable pressure.

By the arrangement I have provided the threads of the plunger as well as the threads of the stem both carry the load and on this account there is absolutely no possibility of the threads cutting or becoming in any way injured.

Further, it will be seen that as none of the parts of the grease cup are removable there is no possibility of foreign material getting mixed in with the grease. This feature is best explained by reference to other types of cups wherein the plungers are removed when the grease is being put in the cup. In such cases the plunger is usually put down on an adjoining part of the locomotive or engine, as the case may be, and as it is greasy dirt will adhere to it and unless it is carefully cleaned this dirt will mix in with the grease and finally find its way into the bearings which is obviously detrimental.

What I claim as my invention is:—

1. A grease cup comprising an internally threaded collar a body formed with a lower cylindrical portion externally threaded for engagement with said collar, an upper non-circular portion perforated to provide a wrench hold and a pair of filling openings on the opposite side of the wrench hold and a feed plunger operating in said body.

2. A grease cup comprising an internally threaded collar a body formed with a lower cylindrical portion externally threaded for engagement with said collar and an upper portion octagonal in cross section having opposite wall portions cut away to provide a wrench hold and a pair of filling openings at opposite sides of the wrench hold, said body being formed with an internal thread extending from the lower extremity of the annular portion to a point above the lower edge of the filling openings, a feed plunger formed with a peripheral thread engaging the internal thread of said body and an actuating stem threaded through the upper end of the body and secured to said plunger.

Signed at Saskatoon, this 16th day of February, 1920.

FRANK JAMES LOZO.

In the presence of:
ESTHER BAIRD,
CLIFFORD R. MORSE.